US009776520B2

(12) United States Patent
Shah (10) Patent No.: US 9,776,520 B2
(45) Date of Patent: Oct. 3, 2017

(54) SYSTEM AND METHOD TO ASSIST IN VEHICLE POSITIONING

(71) Applicant: Proterra Inc., Greenville, SC (US)

(72) Inventor: Keyur M Shah, Greenville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/671,163

(22) Filed: Mar. 27, 2015

(65) Prior Publication Data

US 2016/0280085 A1 Sep. 29, 2016

(51) Int. Cl.
| | | |
|---|---|---|
| H02J 7/00 | (2006.01) | |
| H02J 7/04 | (2006.01) | |
| B60L 11/18 | (2006.01) | |
| G01V 1/00 | (2006.01) | |
| G01S 11/14 | (2006.01) | |
| H02J 7/02 | (2016.01) | |
| G01S 3/802 | (2006.01) | |

(52) U.S. Cl.
CPC ....... *B60L 11/1816* (2013.01); *B60L 11/1833* (2013.01); *G01S 3/802* (2013.01); *G01S 11/14* (2013.01); *G01V 1/00* (2013.01); *H02J 7/025* (2013.01); *B60L 11/1825* (2013.01); *B60L 11/1827* (2013.01); *B60L 11/1838* (2013.01); *H02J 7/0027* (2013.01); *H02J 7/0052* (2013.01); *Y02T 10/7088* (2013.01)

(58) Field of Classification Search
USPC ....... 320/109, 108, 137, 104, 162, 107, 103; 307/104, 10.1, 9.1
See application file for complete search history.

(56) References Cited

U.S. PATENT DOCUMENTS

| | | | |
|---|---|---|---|
| 8,718,856 B2 | 5/2014 | Leary | |
| 2004/0199302 A1* | 10/2004 | Pillar et al. | 701/1 |
| 2009/0228165 A1* | 9/2009 | Ozick et al. | 701/23 |
| 2011/0285349 A1* | 11/2011 | Widmer et al. | 320/108 |
| 2011/0298422 A1* | 12/2011 | Failing | 320/109 |
| 2012/0200151 A1* | 8/2012 | Obayashi et al. | 307/9.1 |
| 2012/0280653 A1* | 11/2012 | Prosser et al. | 320/109 |
| 2013/0193918 A1* | 8/2013 | Sarkar | B60L 3/04 320/109 |
| 2013/0265007 A1* | 10/2013 | Leary | 320/109 |
| 2014/0070764 A1* | 3/2014 | Keeling | 320/108 |
| 2014/0070767 A1* | 3/2014 | Morris | B60L 5/42 320/109 |
| 2014/0092236 A1* | 4/2014 | Findeisen et al. | 348/118 |

(Continued)

FOREIGN PATENT DOCUMENTS

| | | |
|---|---|---|
| CN | 1751910 A | 3/2006 |
| CN | 201089369 Y | 7/2008 |

(Continued)

*Primary Examiner* — Alexis Pacheco
(74) *Attorney, Agent, or Firm* — Bookoff McAndrews, PLLC (57) ABSTRACT

A method for aligning a vehicle at a charging station may include determining the distance between each sensor of the plurality of sensors and a target surface of the charging station. The method may further include aligning the vehicle at the charging station using the determined distance data, and charging the electric vehicle at the charging station. The method may further include using the determined distances to align the side of the vehicle substantially parallel to the target surface.

15 Claims, 4 Drawing Sheets

(56) References Cited

U.S. PATENT DOCUMENTS

| | | | |
|---|---|---|---|
| 2014/0132207 A1* | 5/2014 | Fisher .......................... | 320/108 |
| 2014/0340027 A1* | 11/2014 | Keeling et al. ............... | 320/108 |
| 2015/0094887 A1* | 4/2015 | Kawashima .......... | B60L 11/182 |
| | | | 701/22 |
| 2016/0116568 A1* | 4/2016 | Heuer ...................... | G01S 5/06 |
| | | | 367/127 |

FOREIGN PATENT DOCUMENTS

| | | |
|---|---|---|
| CN | 102390363 B | 8/2014 |
| WO | WO 2010/134763 A2 | 11/2010 |
| WO | WO 2011/139680 A2 | 11/2011 |

* cited by examiner

SYSTEM AND METHOD TO ASSIST IN VEHICLE POSITIONING

BACKGROUND

An electric vehicle (EV) may require charging at charging stations to provide power for operation. During charging, energy storage systems (such as batteries) in the EV store power. This stored power enables the EV to operate until the next charging. In some applications, (e.g., electric transit buses) charging stations may be provided along a route, and an EV may dock with and charge its batteries periodically during its normal operation.

Traditionally, the driver of the EV must visually align the bus with the charging station (e.g., using a line painted on the ground) so that the EV is suitably positioned to engage with the charging station. During charging, electrodes on the EV electrically connect with electrodes of the charging station to transfer power to the batteries of the EV. In some operating conditions, dust, snow, and ice particles (debris) on the ground may make visual alignment difficult. For example, the debris may detrimentally affect the ability of the driver to visually align the EV to the charging station and thus hinder charging.

Embodiments of the current disclosure may alleviate the problems discussed above and/or other problems in the art. The scope of the current disclosure, however, is defined by the attached claims, and not by the ability to solve any specific problem.

SUMMARY

Embodiments of the present disclosure relate to, among other things, systems and methods for aligning a vehicle at a charging station. Each of the embodiments disclosed herein may include one or more of the features described in connection with any of the other disclosed embodiments.

In one embodiment, a method of charging an electric vehicle at a charging station is disclosed. The method may include driving the electric vehicle towards the charging station. The method may also include determining, using a plurality of sensors on electric vehicle, a distance between each sensor of the plurality of sensors and a target surface of the charging station. The method may further include aligning the electric vehicle at the charging station using the determined data, and charging the electric vehicle at the charging station.

In another embodiment, A method of charging an electric vehicle at a charging station is disclosed. The method may include determining distances between multiple points on a side of the vehicle and a target surface of the charging station using a plurality of sensors. The method may also include using the determined relative distances to align the side of the vehicle substantially parallel to the target surface. The method may further include charging the vehicle using the charging station.

In another embodiment, an electric bus is disclosed. The bus may include a body having opposite side surfaces extending between a front surface and a rear surface. The bus may also include a plurality of ultrasonic sensors positioned along one side of the body.

BRIEF DESCRIPTION OF THE DRAWINGS

The accompanying drawings constitute part of the specification and illustrate exemplary embodiments of the present disclosure.

DETAILED DESCRIPTION

The present disclosure describes systems and methods for using ultrasonic sensors to align a bus at a charging station. For example, systems and methods of the current disclosure may be used to align a bus parallel to a curb or another structural feature of a charging station to facilitate charging of an electric vehicle, and to position the vehicle in a proper alignment for charging. While principles of the current disclosure are described with reference to an electric bus aligned using ultrasonic sensors, it should be understood that the disclosure is not limited thereto. Rather, the systems and methods of the present disclosure may be used to assist in aligning any type of vehicle (trains, cars, planes, etc.) for any purpose using any type of sensor.

Figure 1:
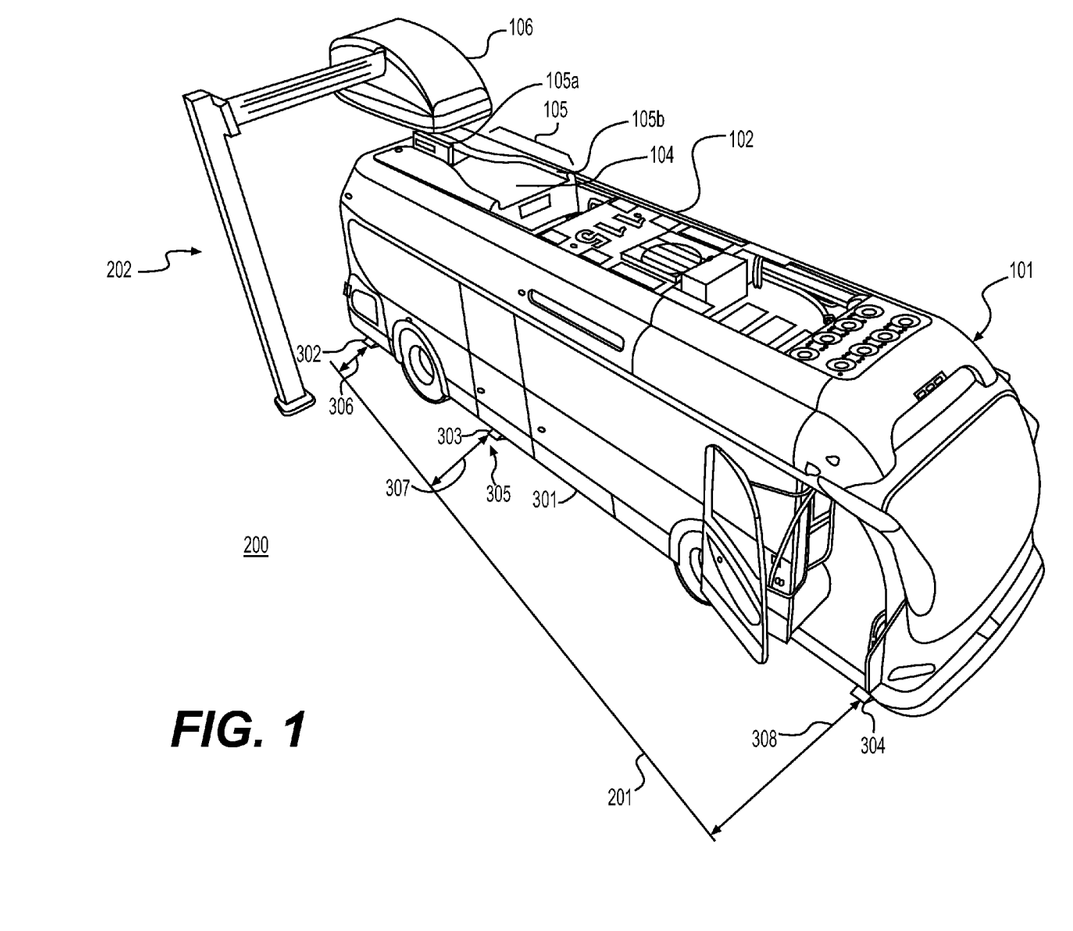
FIG. 1 shows an exemplary bus in accordance with the present disclosure.

FIG. 1 illustrates an electric vehicle in the form of an electric transit bus 101. Electric bus 101 may include a body 102 enclosing a space for passengers. In some embodiments, some (or all) parts of body 102 may be fabricated using composite materials to reduce the weight of bus 101. Without limitation, body 102 of bus 101 may have any size, shape and configuration. In some embodiments, the bus 101 may be a low-floor electric bus. As is known in the art, in a low-floor bus, there are no steps at the front and/or the back doors of the bus. In such a bus, the floor is positioned close to the road surface to ease entry and exit into the bus 101. In some embodiments, the floor height of the low-floor bus may be about 12-16 inches from the road surface. In this disclosure, the term "about" is used to indicate a possible variation of ±10% in a stated numeric value.

Bus 101 may include a powertrain (not shown) that propels the bus 101 along a road surface. The powertrain may include an electric motor that generates power, and a transmission that transmits the power to drive wheels 103 of the bus 101. Batteries may store electrical energy to power the electric motor. In some embodiments, these batteries may be positioned under the floor of the bus 101, and may be configured as a plurality of battery packs. These battery packs may be positioned in cavities (not shown) located under the floor of the bus 101, and may be accessible from below the bus 101. The batteries may have any chemistry and construction. In some embodiments, the batteries may be lithium titanate batteries. In some embodiments, the layout and design of the batteries may enable fast charging of the batteries. By fast charging, batteries may be recharged (to greater than about 95% state of charge) in less than or equal to about 10 minutes.

A charging interface 105 may be provided on the roof of the bus 101 (or elsewhere) to charge the batteries. The charging interface 105 may include components that interface with a charge head assembly 106 of an external charging station 202 to charge the batteries. These components may include a charging blade 105a and an alignment scoop 105b. The alignment scoop 105b may align and direct the overhanging charge head assembly 106 towards the charging blade 105a to electrically connect them and charge the batteries.

Electric bus 101 may be a transit bus that operates along a fixed route in a geographic area (city, town, airport, campus, etc.). Bus 101 may continuously travel on the route picking up and dropping off passengers at several bus stops along the route. One or more charging stations 202 may be located on the route to charge the buses 101. Some of these charging stations 202 may be located at bus stops. The charging station 202 may be coupled to an electric grid that is supplied with energy (electricity) by a utility company. Single phase or three-phase AC current from the electrical grid may be converted to DC current and directed to the charge head assembly 106. The bus stop 200 and/or charging station 202 may include electrical components (e.g., rectifier, power converter, switches, safety mechanisms, etc.) that are configured to convert AC power from the grid to DC current that may be supplied to the bus 101 through the charge head assembly 106. This DC power may be used to charge the batteries.

Bus stop 200 (or charging station 202) may include a feature (e.g., a curb 201, a painted line on the road, building, etc.) which the bus driver may use to align the bus 101 to the charging station 202 for proper charging alignment. Aligning the bus 202 enables the charge head assembly 106 of the charging station 202 to easily engage with the charging interface 105 of the bus 101. For example, in some embodiments, the bus 101 may be positioned with its side (side with the passenger doors) substantially parallel to, and close to, the curb 201 to align the bus 101 to the charging station 202 for charging. In some embodiments, the maximum distance between the side of the bus 101 and the curb 201 should be less than about 2.0 feet.

When the bus 101 is suitably aligned and positioned beneath the charge head assembly 106, the charge head assembly 106 may descend and land on a landing zone 104 of the charging interface 105. The bus 101 may be moving or may be stationary when the charge head assembly 106 lands on the landing zone 104. With the charge head assembly 106 on the landing zone 104, the bus 101 moves forward. As the bus 101 moves forward, the funnel shaped alignment scoop 105b may align and direct the charge head assembly 106 towards the charging blade 105a. The charge head assembly 106 and the charging blade 105a include mating electrodes that indicate (e.g., by a pilot signal) a proper electrical contact between them. When this pilot signal is received, charging of the bus 101 may be initiated. If a pilot signal is not received, the charge head assembly 106 may disengage from the charging interface 105 to let the driver realign/reposition the bus 101 and try again. In some embodiments, after disengagement, the charging station 202 may instruct (by message, signals, etc.) the driver to realign/reposition the bus 101 to the charging station 202. After the bus 101 is repositioned, the charge head assembly 106 may again try to engage with the charging interface 105.

Although the alignment scoop 105b enables the system to tolerate some amount of lateral misalignment, if the bus 101 is not at least roughly aligned with respect to the charging station 202, the charge head assembly 106 may not properly engage with the charging blade 105a. In some embodiments, positioning the bus 101 substantially parallel to, and close to (less than 2.0 feet from), curb 201 of the bus stop 200 may properly align the bus 101 with respect to the charging station 202 for charging. As can be seen in FIG. 1, bus 101 includes several components on its roof (e.g., HVAC unit, radiator, etc.). If the charge head assembly 106 descends and lands at a location other than the landing zone 104, it may collide with one of these components and cause damage. Therefore, in addition to being properly aligned with respect to the charging station 202, the bus 101 should also be positioned such that the charge head assembly 106 lands on the landing zone 104 when it descends. Details of the charge head assembly 106 and the interfacing of the charge head assembly 106 with the charging interface 105 are described in commonly assigned U.S. Patent Publications US 2013/0193918 A1 and US 2014/0070767 A1, which are incorporated by reference in their entirety herein.

Although positioning the bus 101 substantially parallel to, and close to, curb 201 is described as being indicative of proper alignment, this is not a limitation. In general, bus 101 may be aligned with respect to any feature for proper charging alignment. In some embodiments, the bus 101 may be aligned with respect to another feature (a pylon, a wall, charging station pole, etc.) at the charging station 202. The feature may have a fixed position and orientation with the charging station 202. Therefore, the bus 101 may also be aligned with respect to this feature for proper engagement of the charge head assembly 106 with the charging interface 105. In some embodiments, bus 101 and/or charging station 202 may include sensors (or other mechanisms) to assist the driver in aligning the bus 101 with respect to the charging station 202 or another feature. Any type of sensor, (e.g. ultrasonic sensors, GPS, odometric sensors, imaging devices and/or steering wheel sensors) may be used for this purpose. In some embodiments, as will be discussed in more detail below, these sensors may include ultrasonic sensors.

The bus 101 illustrated in FIG. 1 includes three ultrasonic sensors (e.g., first sensor 304, second sensor 303, and third sensor 304) positioned on one side of the bus 101 (at or below the floor level). These sensors may be part of a sensing system 305. In general, sensing system 305 may include any number of ultrasonic sensors positioned anywhere (front, back, side surface, roof etc.) on bus 101. It is also contemplated that some, or all, of these sensors may be positioned on the curb 201 or at another location on the bus stop 200 and/or the charging station 202. In some embodiments, sensing system 305 may include ultrasonic sensors positioned on either side of the bus 101. That is, in addition to the sensors 302, 303, 304 positioned on one side of the bus 101, sensing system 305 may include additional ultrasonic sensors positioned on the opposite side of the bus 101. Ultrasonic sensors 302, 303, and 304 may measure a distance of the side of the bus 101 from the curb 201 (or another feature). Since measurement of distance using an ultrasonic sensor is known in the art, this is not discussed extensively herein.

In some embodiments, as shown in FIG. 1, first sensor 304 may be located proximate to the front right side of the bus 101, second sensor 303 may be located proximate to the middle right side of the bus 101, and third sensor 302 may be located proximate to the rear right side of the bus. The first sensor 304 may determine a first distance 308 between the front of the bus 101 and the curb 201, the second sensor 303 may determine a second distance 307 between the middle of the bus 101 and the curb 201, and the third sensor 302 may determine a third distance 306 between the rear of the bus 101 and the curb 201.

As the bus 101 approaches the curb 201 of a charging station 202, a control system (e.g., control system 502 of FIG. 3) associated with the sensing system 305 may compute the first, second, and third distances 308, 307, 306. These computed distances may be presented to the driver to assist in the proper alignment and positioning of the bus 101 with respect to the charging station 202. In some embodiments, these distances may be presented in a real-time manner so that the driver can maneuver the bus 101 using the measured distances as feedback. Although an embodiment having three sensors is described here, any number of sensors may be positioned on the side of the bus 101 to assist in alignment. For example, in some embodiments, only two ultrasonic sensors (e.g., one in the front and one in the rear) may be used, and in some embodiments, more than three ultrasonic sensors may be used (spaced apart from the front to the rear). Further, although the distances to the curb 201 from the sensors (i.e., first, second, and third distances) are described as being presented to the driver, this is not a requirement. In general, any signal indicative of the distance of the curb 201 from the side of the bus 101 may be presented to the driver.

Figure 2:
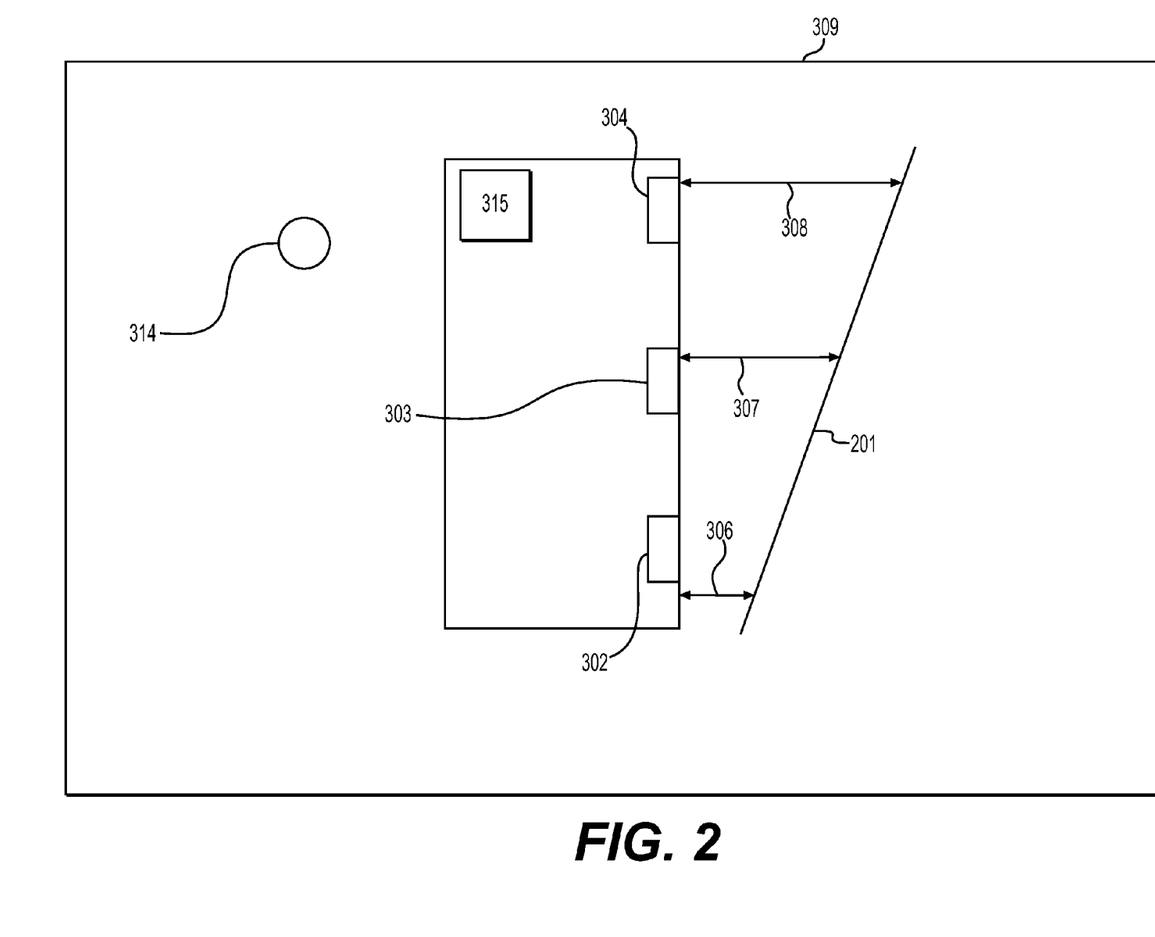
FIG. 2 illustrates an exemplary output displayed to the driver showing the position of the bus.

The distances measured by the control system 502 (e.g., first, second, and third distances) may be presented to the driver in any manner. In some embodiments, the distances may be presented in a textual display. In some embodiments, the distances may be displayed in a graphical display. FIG. 2 illustrates an exemplary output of sensing system 305 to the driver. This output may be displayed on a display terminal 309 of an instrument panel of the bus 101 (e.g. positioned in front of the driver's seat). The output on display terminal 309 may include a graphical illustration of bus 101 and its relative orientation to the curb 201. For example, the graphical illustrations may include the position and orientation of bus 101 and driver 315 with respect to the curb 201. In some embodiments, first, second, and third distances 308, 307, and 306 may be marked on the display. These marked distances may be updated in real-time or periodically. Using the output in the display terminal 309, the driver may maneuver the bus 101, and align it parallel to the curb 201. In some embodiments, only an icon representing the bus 101 and the curb 201 (or another feature used in the alignment) may be shown on the display. In such embodiments, the driver may maneuver the bus 101 based on the relative orientation of the bus 101 and the curb 101 in the display.

In some embodiments, the control system 502 may alert the driver if the alignment and/or the positioning of the bus is not suitable for charging. For instance, in some embodiments, if the difference in the distances measured by different sensors exceeds a preprogrammed threshold value or range, the control system 502 may alert the driver. For example, a threshold value of 0.1 feet may be programmed into the control system 502. If the bus 101 is parallel to a target feature, but outside of the threshold distance from the target feature, the control system 502 may notify the driver that the bus 101 is too far away from the target feature. Further, in some embodiments, if the difference between any two of the first distance 308, second distance 307, and third distance 306 is equal to or greater than 0.5 feet, the control system 502 may alert the driver. The driver may be alerted by any method. In some embodiments, an indicator light 314 in display terminal 309 may be activated to alert the driver. In some embodiments, an audible alarm (or a tactile signal) may be used as the alert. In some embodiments, a blinking light may indicate that the difference between the sensors is greater than or equal to the threshold value. The blinking light may then change to a steady light when the sensor distances are within the threshold value. In other embodiments, a Heads-Up Display (HUD) or LED strips may be used.

In some embodiments, based on the data from the sensing system 305, the control system 502 may recommend a driving pattern or a driving maneuver for the driver to follow in order to align the bus 101 substantially parallel to the curb 201. For example, if the first distance 308 is greater than the third distance 306 by a threshold amount, the control system 502 may instruct the driver to turn right. Similarly, the control system 502 may instruct the driver to turn left if the third distance 306 is greater than the first distance 308. The control system 502 may also provide navigational instructions to the driver (e.g., rotate the steering wheel clockwise or counterclockwise by a calculated amount, etc.) in order to align the bus 101 substantially parallel to the curb 201. In some embodiments, the control system 502 may autonomously pilot the vehicle based on the data from the sensing system 305. For example, the control system 502 may autonomously pilot the bus 101 and align it substantially parallel and close to the curb 201 using the measured distances as feedback.

As noted above, the control system 502 may use the display terminal 309 to provide instructions to the driver. Alternatively or additionally, in some embodiments, a haptic feedback device (e.g., located beneath the bus driver's seat) may be provided to the bus 101. The haptic feedback device may, for example, vibrate (e.g., selectively on a left side or a right side) to provide navigational guidance to the bus driver. In other embodiments the accelerator pedal or the brake pedal of bus 101 of the may be calibrated to provide a predetermined acceleration or constant speed of the bus 101 to guide the bus 101 into a proper alignment with respect to the curb 201.

Figure 3:
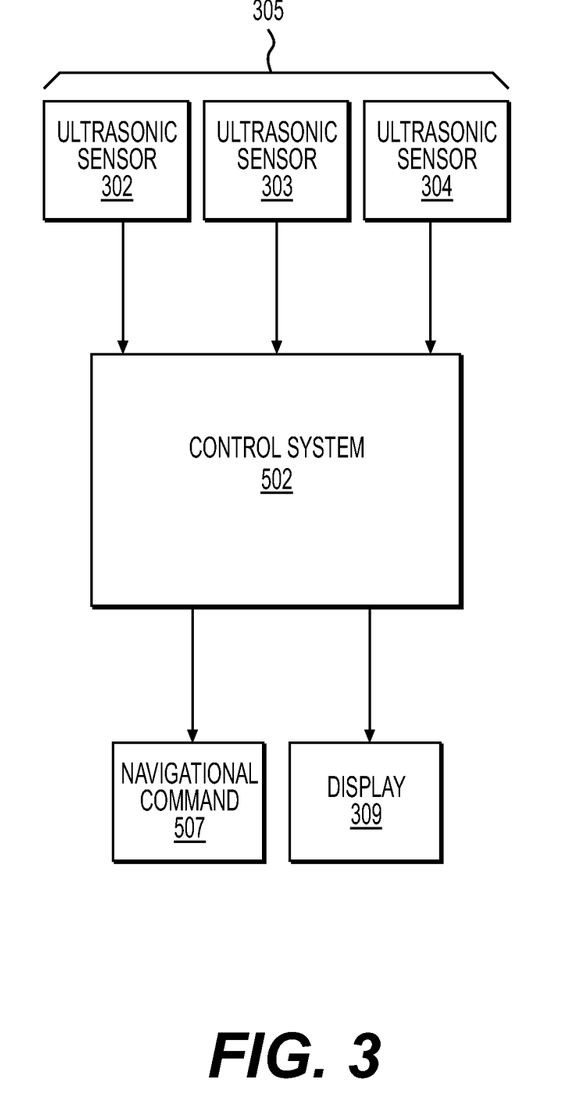
FIG. 3 illustrates an exemplary control system of the bus of FIG. 1.

FIG. 3 illustrates an exemplary control system 502 that provides instructions or navigation commands 507 to the driver using data from sensing system 305. Control system 502 may be part of, or separate from, another control system of the vehicle (e.g., vehicle system system). Signals from the ultrasonic sensors (e.g., first sensor 304, second sensor 303, and third sensor 302) and other sensors (e.g., camera, etc.) may be input into the control system 502. Based on the input from these sensors, the control system 502 may position and align the bus with respect to the charging station 202. In some embodiments, the control system 502 may compute the distances of each sensor to the curb 201 (i.e., first, second, and third distances 308, 307, 306). These computed distances may be presented to the driver in display terminal 309, and the driver may suitably align and position the bus 101 with respect to the charging station 202 using these distances. The control system 502 may also provide navigational commands 507 (e.g., turn right, etc.) to the driver based on the computed distances. In some embodiments, these navigational commands 507 may be used to autonomously maneuver the bus 101 into a desired position.

Figure 4:
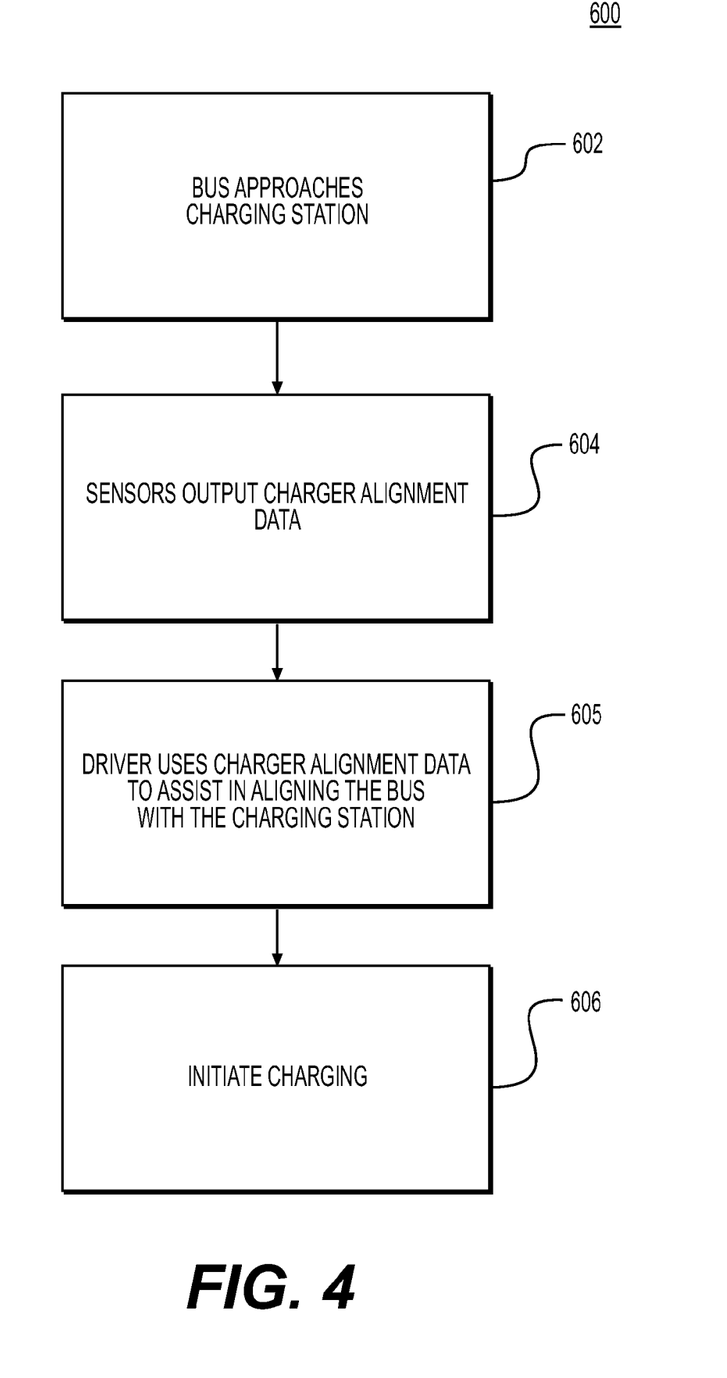
FIG. 4 is a flowchart illustrating an exemplary method of charging the bus of FIG. 1.

FIG. 4 illustrates an exemplary method 600 of aligning the bus 101 for charging using sensing system 305. The bus 101 may approach the charging station 202 for charging (step 602). As the bus 101 is maneuvered into position at the charging station 202, the sensing system 305 of the bus 101 may output the relative orientation and distance of the bus 101 with respect to the charging station 202 (step 604). In some embodiments, this step may include displaying the distance of different portions (front, rear, etc.) of bus 101 from the curb 201 (or other structural feature). In some embodiments, one or more indicator lights (and/or other alarms) may also be activated to indicate the relative orientation and distance of the bus 101 with respect to the curb 201. Using the output from the sensing system 305, the driver may pilot the bus 101 to align the bus 101 with respect to the charging station 202 in a manner suitable for charging (step 605). In some embodiments, the driver may align the bus 101 substantially parallel to the curb 201 using the output from the sensing system 305. With the bus 101 thus aligned, the charge head assembly 106 of a charging station 202 may engage with the charging interface 105 and begin charging (step 606).

The present disclosure may be used in conjunction with existing charging stations 202 and docking protocols as described in US Patent publication 2013/0193918 A1. In existing docking protocols, upon entering the charging station 202, an ultrasonic sensor of the charge head assembly 106 may map the roof profile of the bus 101 to ensure that the charge head assembly 106 lands in the landing zone 104. The alignment method and system of the current disclosure may be used with such a docking protocol to confirm alignment and positioning of the bus 101 for proper charge head assembly engagement. Using ultrasonic sensor data to align the bus 101 in a manner suitable for charging saves time and improves efficiency by reducing docking failures that result from the misalignment of the charge head assembly 106 to the charging interface 105. The ultrasonic sensors may also be used to align the bus 101 for charging at night and when weather conditions make visual alignment of the bus 101 to the charging station 202 difficult.

While principles of the present disclosure are described with reference to an electric bus, it should be understood that the disclosure is not limited thereto. Rather, the systems and methods described herein may be employed to assist in the alignment of any vehicle. Those having ordinary skill in the art and access to the teachings provided herein will recognize additional modifications, applications, embodiments, and substitution of equivalents all fall within the scope of the embodiments described herein.

I claim:

1. A method of charging an electric vehicle at a charging station, comprising:
    driving the electric vehicle towards the charging station, the electric vehicle including a roof, a floor, and multiple side surfaces connecting the roof and the floor, and a plurality of ultrasonic sensors positioned on an external side surface of the vehicle, wherein the plurality of ultrasonic sensors are (a) spaced apart from each other and (b) arranged along a direction of travel of the electric vehicle;
    determining a distance between each sensor of the plurality of ultrasonic sensors and a target surface of the charging station, wherein the plurality of ultrasonic sensors are aimed towards the target surface;
    aligning the electric vehicle at the charging station based on the determined distance;
    moving a charge head assembly of the charging station to engage with a charging interface of the electric vehicle; and
    establishing an electrical connection between the electric vehicle at the charging station.

2. The method of claim 1, further including automatically piloting the electric vehicle based on the determined data.

3. The method of claim 1, further including notifying a driver of the electric vehicle when a difference in the distance between any two sensors of the plurality of ultrasonic sensors and the target surface exceeds a predetermined value.

4. The method of claim 1, further including, after the determining, suggesting a driving pattern for the driver to follow to align the electric vehicle at the charging station.

5. The method of claim 1, wherein one sensor of the plurality of ultrasonic sensors is located at a front side surface of the electric vehicle, one sensor of the plurality of sensors is located at a middle side surface of the electric vehicle, and one sensor of the plurality of sensors is located at a rear side surface of the electric vehicle.

6. The method of claim 1, further including displaying the determined data on a display terminal of the electric vehicle.

7. The method of claim 1, wherein moving the charge head assembly includes lowering the charge head assembly to land on a roof of the electric vehicle, and moving the electric vehicle to electrically connect the charge head assembly with the charging interface.

8. A method of charging an electric vehicle at a charging station, comprising:
    driving the electric vehicle towards the charging station, the electric vehicle including a roof, a floor, and multiple side surfaces connecting the roof and the floor, the electric vehicle also including a charging interface on the roof and a plurality of ultrasonic sensors positioned on an external side surface of the vehicle and spaced apart along a direction of travel of the electric vehicle, the plurality of ultrasonic sensors including at least (a) one sensor at the front of the electric vehicle, (b) one sensor at the back of the electric vehicle, and (c) one sensor in the middle of the electric vehicle;
    determining distances between multiple points on a side surface of the multiple side surfaces and a target surface of the charging station using the plurality of ultrasonic sensors;
    using the determined distances to align the side surface of the electric vehicle substantially parallel to the target surface;
    moving a charge head assembly of the charging station to land on the roof of the electric vehicle;
    after the moving, moving the electric vehicle to make electrical contact between the charge head assembly and the charging interface of the electric vehicle; and
    charging the electric vehicle using the charging station.

9. The method of claim 8, further including notifying a driver of the electric vehicle when a difference in the determined distances between the multiple points and the target surface exceeds a predetermined value.

10. The method of claim 8, wherein the target surface is a curb of the charging station.

11. The method of claim 8, further including providing navigational instructions to a driver of the vehicle based on the determined distances.

12. A method of charging an electric bus at a charging station, comprising:
    driving the bus towards the charging station, the bus including (a) a roof, a floor, and first side surface connecting the roof and the floor, the first side surface including a door (b) a plurality of ultrasonic sensors positioned on an external side surface of the bus and spaced apart along a direction of travel of the bus, a first sensor of the plurality of ultrasonic sensors being positioned on one side of the door and a second sensor of the plurality of ultrasonic sensors being positioned on another side of the door, and (c) a charging interface, and the charging station including (i) a charge head assembly and (ii) a target surface;
    determining a first distance and a second distance as the bus is driving towards the charge head assembly, the first distance being a distance between the first sensor and the target surface and the second distance being the distance between the second sensor and the target surface;

maneuvering the bus based on the determined first and second distances such that the first side surface of the bus is aligned with respect to the target surface in a predetermined manner;

engaging the charge head assembly with the bus;

adjusting a position of the bus after the engaging to make electrical contact between the charge head assembly and the charging interface of the bus; and charging the bus through the charge head assembly.

13. The method of claim 12, further including displaying a graphical illustration of a relative orientation of the bus with respect to the target surface.

14. The method of claim 13, wherein the maneuvering step includes maneuvering the bus such that the first side surface is aligned substantially parallel to the target surface.

15. The method of claim 12, wherein the charging interface is positioned on the roof of the bus, and the engaging step includes lowering the charging interface on the roof.

* * * * *